Patented Feb. 23, 1954

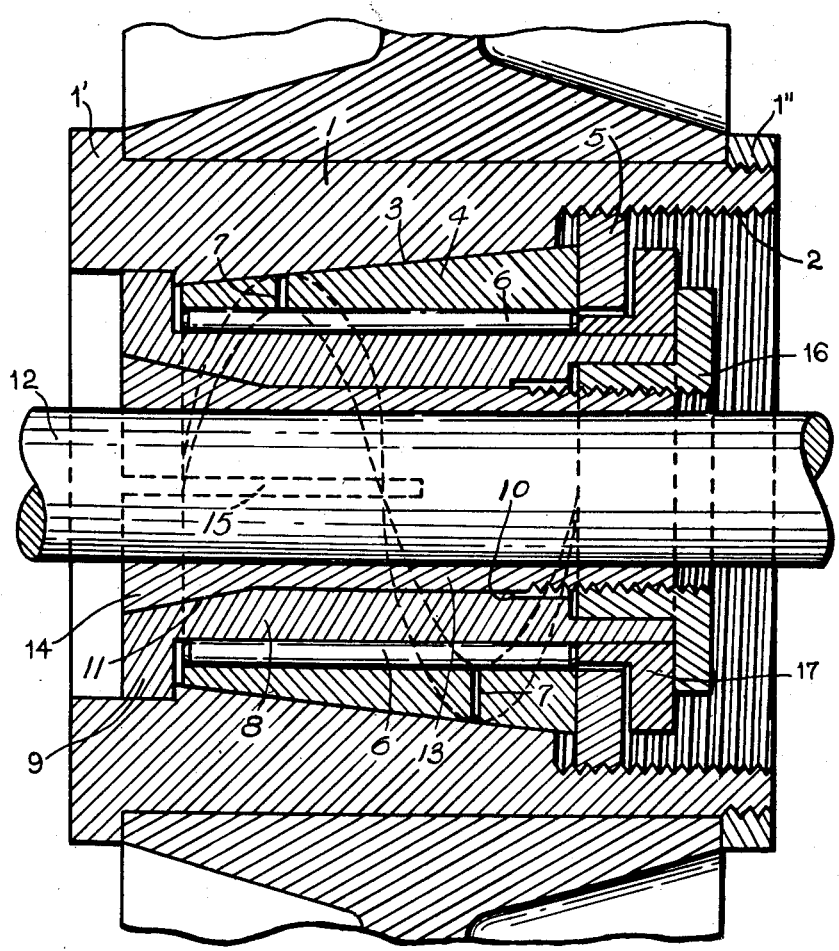

2,670,253

UNITED STATES PATENT OFFICE 2,670,253

NEEDLE BEARING

Hermann Scherler, Bois-Colombes, France, assignor, by mesne assignments, to Society Usines Tornos, Fabrique de Machines Moutier S. A.

Application April 9, 1949, Serial No. 86,578

Claims priority, application France April 12, 1948

7 Claims. (Cl. 308—207)

This invention relates to needle bearings and more particularly to an improved type of such bearings provided with a device to make up the play caused by the wear of needles and that of their rolling paths. The needle bearing according to invention is characterized by the feature that its outer rolling path is formed by the inner surface of an outwardly tapered sleeve constituted by a single body and provided with a helical split, shaped in a single and complete turn of spiral, the pitch of which is equal to the length of said sleeve; this sleeve is being lodged within a tapered bore of an outer body or case said sleeve fitting exactly into said bore and being secured therein by means of a clamping nut.

In the accompanying drawing an embodiment of a bearing according to invention is shown in an axial cross sectional view.

The bearing shown in the drawing consists of an outer body or case 1 which can be secured within a bracket or support of any kind by means of a flange 1' and by a tightening ring 1". At one end of said outer body or case 1 a threaded cylindrical boring 2 is provided, the same being followed by a slightly conical boring 3 wherein the sleeve 4 is to be lodged. Said sleeve 4 is slightly tapered outwardly and fits exactly into said conical bore 3 wherein it is held by means of a clamping ring 5 forming a kind of nut screwed within said inner threading 2. The inner cylindrical bore of the sleeve 4 forms the outer rolling path of the needles 6; in the body of said sleeve a helical split 7 is provided which may cover e. g. a whole single-turn of screw.

Preferably, the outer taper of said sleeve 4 will attain about 1%. The inner rolling path of the needles 6 is constituted by the outer surface of a cylindrical socket 8 provided at one end with a flange 9, the cylindrical bore 10 whereof is terminating at one of its ends in a conical housing 11. Within said bore and said housing 11 a gripper 13 is lodged the bore whereof is tightening upon the shaft 12; said gripper has a conical head 14 at one of its ends so shaped as to fit into the above said conical housing 11. In said gripper 13 an axial split 15 extending through a part of its length is provided whereas at the other end the gripper body 13 is threaded and a clamping nut is engaged with this threaded part allowing the gripper 13 to be blocked simultaneously on the shaft 12 and within the socket 8 of the inner rolling path. A washer with a thrust border 17 is disposed between the two clamping nuts 16 and 5.

The device operates as follows:

As soon as a radial play of the parts is caused by the wear of the needles or that of the rolling paths it is enough to tighten the clamping nut 5 exerting so a push upon the split tapered sleeve 4, which, being resiliently deformed is pushed into the interior of its conical housing so that its inner diameter is diminished.

So the radial play between the parts may be absorbed. The slight taper of said sleeve 4 allows a very slow decrease of the inner sleeve diameter to be obtained as compared with the relatively important rotation of the tightening nut necessary to this purpose so that the device may be adjusted with high precision.

What I claim is:

1. Needle bearing comprising in combination an outwardly tapered sleeve, constituted by a single body and provided with an inner cylindrical surface forming the outer needle race and with a helical split shaped in a single and complete turn of spiral, the pitch of which is equal to the length of said sleeve, an outer case provided with a tapered bore wherein said sleeve is lodged, an inner thread in said case, a tightening nut engaging said inner thread, a cylindrical socket forming the inner race and having at one and the same end a flange and a conical flare, a shaft gripping tube disposed inside said socket and provided with a conical split head corresponding to said conical flare and at the opposite end with an outer thread, a second tightening nut engaging said outer thread and a washer arranged between the two tightening nuts, said washer and the flange of the cylindrical socket forming the axial abutments of the bearing.

2. Needle bearing comprising: an outwardly tapered sleeve, constituted by a single body and provided with an inner cylindrical surface forming the outer needle race and with a helical split shaped in a single and complete turn of a spiral, the pitch of which is equal to the length of said sleeve, an outer case provided with a tapered bore wherein said sleeve is lodged, a thread on said case, a tightening nut screwed into said thread and operatively engaged with said sleeve for urging same into said tapered bore, a tubular member having an outer cylindrical surface forming the inner needle race, needles inserted between the outer race and the inner race, a flange at one end of said tubular member, and a washer fixedly mounted at the other end of said tubular member, said flange and said washer forming the axial abutments of the needles.

3. Needle bearing comprising in combination:

a sleeve, said sleeve being made of a single body having an outer tapered surface and having an inner cylindrical surface forming the outer needle race, said tapered sleeve being helically split, an outer case having a tapered bore wherein said tapered sleeve is lodged, an inner thread in said case, a tightening nut engaging said inner thread, a cylindrical socket forming the inner race and having at one and the same end a flange and a conical flare, needles inserted between the outer race and the inner race, a shaft gripping tube disposed inside said socket and provided with a conical split head corresponding to said conical flare and at the opposite end with an outer thread, a second tightening nut engaging said outer thread and a washer arranged between the two tightening nuts, said washer and the flange of the cylindrical socket forming the axial abutments of the needles.

4. Needle bearing comprising in combination: a sleeve, said sleeve being made of a single body having an outer tapered surface and having an inner cylindrical surface forming the outer needle race, said tapered sleeve being helically split, an outer case having a tapered bore wherein said tapered sleeve is lodged, a thread on said case, a first tightening nut screwed into said thread of the case and operatively engaged with said sleeve for urging same into said tapered bore, a tubular member having an outer cylindrical surface forming the inner needle race, said tubular member having at one of its ends a flange and a conical flare, needles inserted between the outer race and the inner race, a shaft gripping tube arranged within said tubular member and provided with a conical split head corresponding to said conical flare and at the opposite end with an outer thread, a second tightening nut screwed into said outer thread of the shaft gripping tube and operatively engaged with the other end of said tubular member for urging said conical flare and said conical split head into cooperative engagement, and a washer fixedly mounted on the other end of said tubular member, said washer and said flange of the tubular member forming the axial abutments of the needles.

5. In a needle bearing as claimed in claim 4, said helical split of the sleeve being shaped in a single and complete turn of a spiral, the pitch of said spiral being equal to the length of said sleeve.

6. A needle bearing for rotatably supporting a revolving element, comprising a tubular element coaxially mounted on said revolving element, the said tubular element having an outer cylindrical surface, a flange at one of its ends and a washer freely mounted at its other end, means for securing the said tubular element on the said revolving element, an outwardly tapered sleeve, constituted by a single body and provided with an inner cylindrical surface, the said sleeve being coaxially mounted on the tubular element in spaced relation therewith and having a helical split shaped in a single and complete turn of a spiral, the pitch of which is equal to the length of said sleeve, needles inserted between the outer cylindrical surface of the tubular element and the inner cylindrical surface of the sleeve, each of said needles bearing simultaneously against both said cylindrical surfaces and admitting said flange and washer as abutments, an outer case provided with a tapered bore wherein said sleeve is fitted and means operatively engaged with the outer case and with the sleeve for urging same into the tapered bore.

7. A needle bearing for rotatably supporting a revolving element, comprising a tubular element coaxially mounted on said revolving element, the said tubular element having an outer cylindrical surface, a flange at one of its ends and a washer freely mounted at its other end, means for securing the said tubular element on the said revolving element, an outwardly tapered sleeve, constituted by a single body and provided with an inner cylindrical surface, the said sleeve being coaxially mounted on the tubular element in spaced relation therewith and having a helical split shaped in a single and complete turn of a spiral the pitch of which is equal to the length of said sleeve, needles inserted between the outer cylindrical surface of the tubular element and the inner cylindrical surface of the sleeve, each of said needles bearing simultaneously against both said cylindrical surfaces and admitting said flange and washer as abutments, an outer case provided with a tapered bore wherein said sleeve is fitted, a thread on said case, a tightening nut screwed into said thread and operatively engaged with said sleeve for urging same into tapered bore.

HERMANN SCHERLER.

References Cited in the file of this patent

UNITED STATES PATENTS

| Number | Name | Date |
|---|---|---|
| 821,322 | Worrell | May 22, 1906 |
| 913,767 | Rivett | Mar. 2, 1909 |
| 921,442 | Newmann | May 11, 1909 |
| 2,092,985 | Okner et al. | Sept. 14, 1937 |
| 2,358,518 | Kraft | Sept. 19, 1944 |
| 2,362,566 | Lappert | Nov. 14, 1944 |
| 2,377,035 | Pixley | May 29, 1945 |